US010527790B2

(12) United States Patent
Potluri et al.

(10) Patent No.: US 10,527,790 B2
(45) Date of Patent: Jan. 7, 2020

(54) PASSIVE FIBER COUPLER WITH UV WINDOWS

(71) Applicant: Cisco Technology, Inc., San Jose, CA (US)

(72) Inventors: Kumar Satya Harinadh Potluri, Milpitas, CA (US); Ashley J. Maker, Pleasanton, CA (US); Vipulkumar Patel, Breinigsville, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/841,005

(22) Filed: Dec. 13, 2017

(65) Prior Publication Data

US 2019/0179079 A1 Jun. 13, 2019

(51) Int. Cl.
| | |
|---|---|
| *G02B 6/12* | (2006.01) |
| *G02B 6/122* | (2006.01) |
| *G02B 6/32* | (2006.01) |
| *G02B 6/38* | (2006.01) |
| *G02B 6/42* | (2006.01) |

(Continued)

(52) U.S. Cl.
CPC ....... *G02B 6/1225* (2013.01); *G02B 6/12004* (2013.01); *G02B 6/325* (2013.01); *G02B 6/3652* (2013.01); *G02B 6/38* (2013.01); *G02B 6/422* (2013.01); *G02B 6/4212* (2013.01); *G02B 6/4239* (2013.01); *G02B 6/4243* (2013.01); *G02B 6/4244* (2013.01); *G02B 6/30* (2013.01); *G02B 6/428* (2013.01)

(58) Field of Classification Search
CPC .. G02B 6/1225; G02B 6/12004; G02B 6/325; G02B 6/38; G02B 6/4212; G02B 6/422; G02B 6/4244

USPC .......................................................... 385/14
See application file for complete search history.

(56) References Cited

U.S. PATENT DOCUMENTS

| | | | |
|---|---|---|---|
| 6,866,426 | B1 | 3/2005 | Steinberg et al. |
| 7,203,410 | B2 | 4/2007 | Wei et al. |
| 9,513,445 | B2 | 12/2016 | Cox et al. |

(Continued)

FOREIGN PATENT DOCUMENTS

KR   20110083171 A   7/2011

OTHER PUBLICATIONS

U.S. Appl. No. 15/636,262 "TSV Compatible Fiber Array Coupler for Silicone Photonics", as filed Jun. 28, 2017.

(Continued)

*Primary Examiner* — Jerry M Blevins
(74) *Attorney, Agent, or Firm* — Patterson + Sheridan, LLP (57) ABSTRACT

Embodiments herein describe a fiber array unit (FAU) configured to couple a photonic chip with a plurality of optical fibers. Epoxy can be used to bond the FAU to the photonic chip. However, curing the epoxy between the FAU and the photonic chip is difficult. As such, the FAU can include one or more optical windows etched into a non-transparent layer that overlap with epoxy wells in the photonic chip. Moreover, the FAU may include a transparent substrate on which the non-transparent layer is disposed that permits UV light to pass therethrough. As such, during curing, UV light can be pass through the transparent substrate and through the optical windows in the non-transparent layer to cure the epoxy disposed between the FAU and the photonic chip.

20 Claims, 10 Drawing Sheets

(51) Int. Cl.
   *G02B 6/36* (2006.01)
   *G02B 6/30* (2006.01)

(56) References Cited

U.S. PATENT DOCUMENTS

| | | |
|---|---|---|
| 2002/0196998 A1 | 12/2002 | Steinberg et al. |
| 2003/0210873 A1 | 11/2003 | Moretti |
| 2004/0190851 A1* | 9/2004 | Garner ................. G02B 6/3672 385/137 |
| 2013/0005606 A1* | 1/2013 | Chakravarty ........ G01N 21/253 506/9 |
| 2013/0015580 A1* | 1/2013 | Jain ................. H01L 21/823807 257/751 |
| 2015/0063747 A1 | 3/2015 | Chen et al. |
| 2017/0205592 A1 | 7/2017 | Pfnuer |

OTHER PUBLICATIONS

PCT Notification of Transmittal of the International Search Report and the Written Opinoin of the International Searching Authority, or the Declaration for Application No. PCT/US2018/065305 dated Apr. 18, 2019.

\* cited by examiner

PASSIVE FIBER COUPLER WITH UV WINDOWS

TECHNICAL FIELD

Embodiments presented in this disclosure generally relate to photonic devices, and more specifically, to edge coupling with photonic devices.

BACKGROUND

Generally, photonic chips have interfaces to permit optical signals to be received from an optical source (e.g., a laser or an optical fiber) or transmitted to an optical fiber. One such method is edge coupling where the optical fiber is coupled to the edge of the photonic chip. As the level of integration, speed of operation, and functionality increase, photonic chips are running out of peripheral bond pad space to allow wire bond based interconnection to the underlying substrate or printed circuit board (PCB). Thus, photonic chips with Through Silicon Vias (TSVs) are highly desirable as they allow for higher density of interconnects and reduce the resistance as well as inductance associated with the wirebond connections.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is a method that includes disposing epoxy into an epoxy well in a photonic chip and aligning an optical interface of the photonic chip to an optical fiber mounted on a fiber array unit (FAU) where the FAU comprises a first layer disposed on a transparent substrate, wherein the first layer comprises an optical window, and where the transparent substrate and the optical window are disposed over the epoxy well when the optical fiber is aligned to the optical interface. The method includes curing the epoxy by passing electromagnetic radiation through the transparent substrate and the optical window to reach the epoxy well.

Another embodiment presented herein is an optical system that includes a photonic chip with a waveguide, an optical interface optically coupled to the waveguide, and an epoxy well. The optical system also includes a FAU coupled with the photonic chip using cured epoxy in the epoxy well. The FAU includes a transparent substrate, a first layer disposed on the transparent substrate, the first layer comprising an optical window and a groove, an optical fiber disposed in the groove and aligned to the optical interface in the photonic chip, and a lid where the optical fiber is disposed between the lid and the transparent substrate. Moreover, the transparent substrate and the optical window are disposed over the epoxy well.

Another embodiment presented herein is a FAU that includes a transparent substrate, a first layer disposed on the transparent substrate, where a material of the transparent substrate is transparent to UV light while a material of the first layer blocks UV light, an optical window in the first layer where at least one side of the optical window is formed by the transparent substrate, a groove formed in the first layer, and an optical fiber disposed in the groove where a first portion of the transparent substrate extends beyond a termination end of the optical fiber, and where the optical window is disposed on the first portion of the transparent substrate.

Example Embodiments

Generally, photonic chips have an optical interface to transmit optical signals to an optical fiber, or to receive optical signals from an optical source such as a laser or optical fiber. Some optical interfaces include edge couplers disposed at the sides of the photonic chip, which makes edge couplers easier to manufacturer and improve optical coupling compared to other solutions. However, photonic chips with TSVs have several additional constraints on edge coupling. Wafers with TSVs are thinner (typically in the range of 50 um to 150 um). Hence, even though shallow trenches in a silicon substrate are possible, deep trenches (typically created by Deep Reactive Ion Etching (DRIE)) cannot be created to accommodate a lens or fiber placement for an edge coupler. In addition, TSVs constrain the overall optical packaging or assembly since photonic chips with TSVs are typically attached to a glass or silicon interposer or a ceramic or an organic substrate using conventional solder reflow or thermal compression bonding processes. As such, conventional edge coupling techniques cannot be used with a photonic chip that has TSVs.

In order for optical components (e.g., photonic chip, optical fiber, laser, etc.) to function properly, the optical components need to be aligned with each other. Optical alignment is the process of aligning optical elements with one another to maximize the accuracy and performance of transmitted signals. Active alignment requires a person to view and align the different components based on feedback when transmitting optical signals between the components, which increases the cost of manufacturing photonics chips. Passive alignment (also referred to as mechanical alignment) relies on strict manufacturing tolerance of components and optical based initial placement to ensure the components are aligned properly when the components are placed at their respective position without the need for aligning the components based on feedback—i.e., without transmitting optical signals between the components.

Embodiments herein describe a fiber array unit (FAU) configured to align a plurality of optical fibers to a photonic chip. The FAU has a plurality of grooves for receiving the plurality of optical fibers. In one embodiment, the FAU includes at least one alignment feature that correspond to an alignment feature in the photonic chip to achieve passive alignment. Epoxy can be used to bond the FAU to the photonic chip when the optical fibers attached to the FAU are aligned with an optical interface in the photonic chip. However, curing the epoxy between the FAU and the photonic chip is difficult. As such, in the embodiments herein the FAU includes one or more optical windows etched into a non-transparent layer (e.g., a silicon layer or first layer) that overlap epoxy wells in the photonic chip. Moreover, the FAU may include a transparent substrate (e.g., silicon dioxide) which permits UV light to pass therethrough. As such, during curing, UV light can be passed through the transparent substrate and through the optical windows in the non-transparent layer to cure the epoxy disposed between the FAU and the photonic chip.

Figure 1:
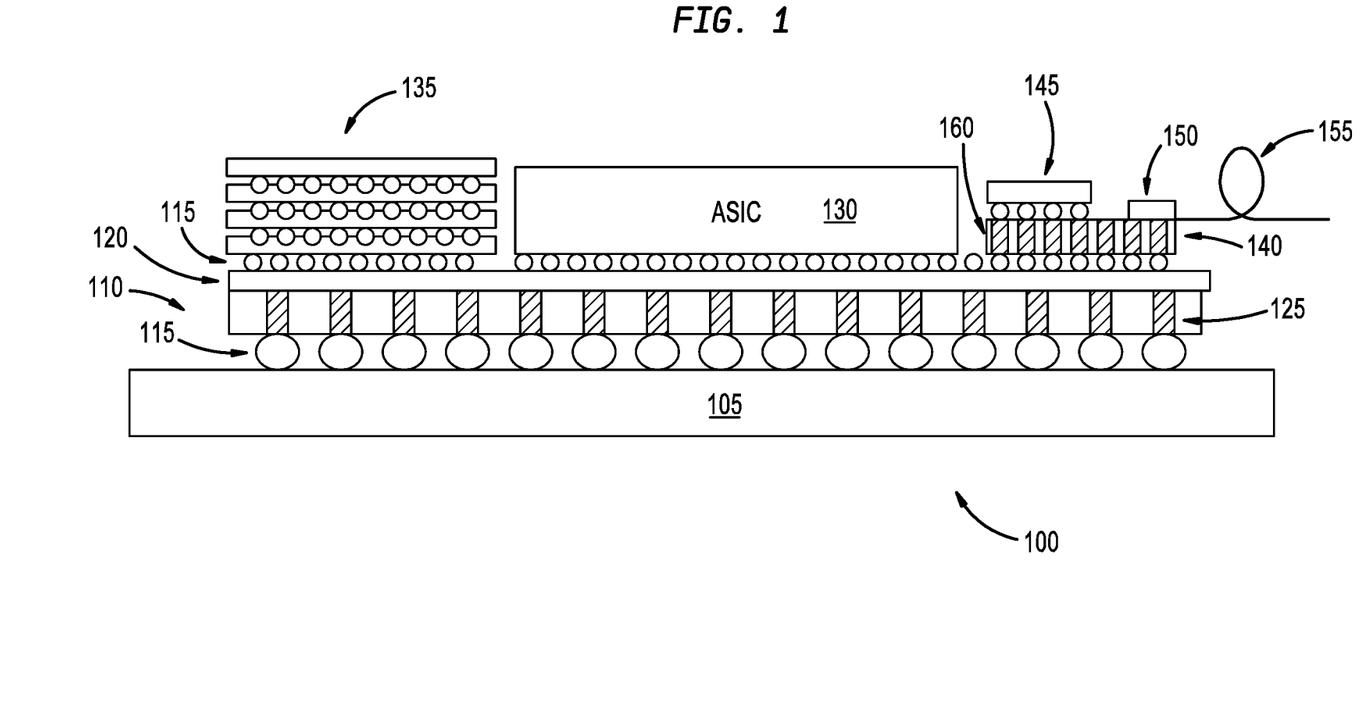
FIG. 1 illustrates an optical system, according to one embodiment disclosed herein.

FIG. 1 illustrates an optical system 100, according to one embodiment herein. As shown, the optical system 100 has a substrate 105 and an interposer layer 110 connected via solder 115. The interposer layer 110 is a layer with through electrical connections and routing layers on Silicon, Glass, Ceramic or organic material. The interposer layer 110 is coupled to a redistribution layer (RDL) 120. Coupled to the RDL 120 are an application specific integrated circuit (ASIC) 130, a high bandwidth memory (HBM) 135, and a photonic chip 140 which includes a semiconductor material. The RDL 120 allows electrical connections to be made between electrical components coupled to it. Stated differently, the RDL 120 allows components (e.g., the ASIC 130, the HBM 135, the photonic chip 140, etc.) to communicate electrically by minimizing external electrical connections. As shown, the interposer layer 110 has a plurality of Through Silicon Vias (TSVs) 125, which couple the RDL 120 to the semiconductor substrate 105. While the interposer layer 110 is shown with TSVs, the interposer layer 110 may be made of glass in which case the interposer layer 110 would be a through via or a through oxide via. In one embodiment, the TSVs 125 provide power to the RDL 120 which in turn routes the power to the ASIC 130, the HBM 135, and the photonic chip 140.

As shown, the photonic chip 140 is coupled to a driver 145 and a FAU 150. The driver 145 sends/receives signals to/from an optical fiber 155 via the FAU 150 and the photonic chip 140. In another embodiment, the driver 145 is a transimpedance amplifier that amplifies the electrical signals generated by an optical detector (not shown) in the photonic chip 140 in response to photonic signals received from the optical fiber 155 mounted on the FAU 150. As shown, the photonic chip 140 has a plurality of TSVs 160. In one embodiment, the photonic chip 140 provides power from the Printed Circuit Board (PCB) or organic/ceramic substrate through the interposer layer 110 to the driver 145 via one of the TSVs 160.

In one embodiment, the ASIC 130 and the driver 145 communicate via the TSVs 160 in the photonic chip 140, as well as the interposer layer 110 and the RDL 120. In one embodiment, the ASIC 130 includes logic for providing data to and from the photonic chip 140 from outside the system 100. For example, the ASIC 130 can send signals to the driver 145 such that the driver 145 sends a signal to a modulator (not shown) in the photonic chip 140, and the modulator encodes the data from the driver 145 onto an optical signal. In one embodiment, at high speed operation, the driver 145 is placed directly onto the photonic chip 140 to provide electrical connections that are as short as possible. In one embodiment, the optical detector in the photonic chip 140 outputs voltages based on a received optical signal to the driver 145. The driver 145 in turn provides data to the ASIC 130 based on the received signal. In one embodiment, the HBM 135 stores settings for the ASIC 130 which dictate how the ASIC 130 communicates between the driver 145 and external devices and systems. In another embodiment, the HBM 135 stores settings for how the photonic chip 140 receives and transmits optical signals.

In one embodiment, the photonic chip 140 is a photonics transceiver that receives and transmits optical signals. For example, an optical signal may be transmitted along the optical fiber 155 where the photonic chip 140 receives the optical signal. As another example, the photonic chip 140 transmits an optical signal to the optical fiber 155. In this manner, the photonic chip 140 can communicate using the optical fiber 155 to an external system. In one embodiment, the photonic chip 140 is an optical modulator that is controlled by electrical data signals received from the driver 145. In another embodiment, the photonic chip 140 is an optical detector that transmits electrical signals to the ASIC 130 via the driver 145. Specifically, the TSVs 160 of the photonic chip 140 and traces on the PCB or organic/ceramic substrate have an electrical signal that corresponds to an optical signal detected by the photonic chip 140. In this manner, the optical system 100 may send and/or receive optical signals.

Figure 2:
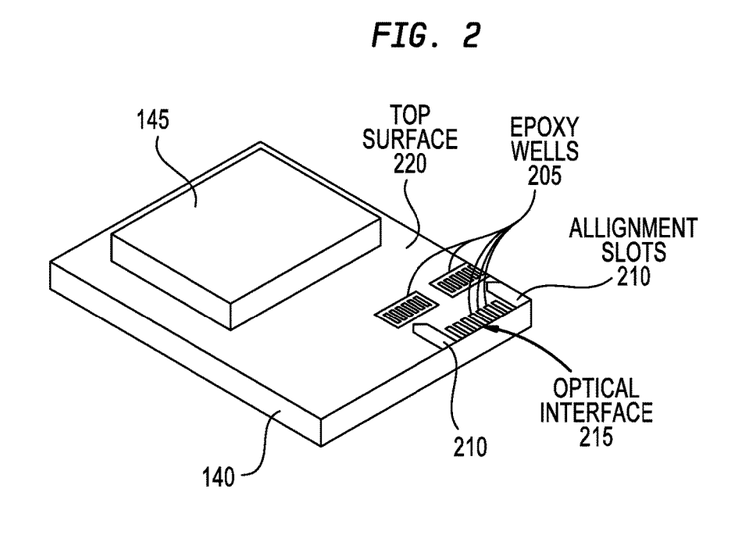
FIG. 2 illustrates alignment features for coupling a photonic chip to a fiber array unit, according to one embodiment disclosed herein.

FIG. 2 illustrates alignment features for coupling the photonic chip 140 to a FAU, according to one embodiment disclosed herein. As shown, the features are formed in a top surface 220 of the photonic chip 140 on which the driver 145 is mounted. In this embodiment, the features include epoxy wells 205, alignment slots 210, and an optical interface 215. The epoxy wells 205 may include etched portions of the top surface 220 that have been recessed for receiving epoxy for coupling the photonic chip 140 to the FAU (not shown). In this example, the two epoxy wells 205 furthest from the optical interface 215 includes raised features (e.g., islands). The raised features may have the same height as the other portions of the top surface 220 of the photonic chip 140. However, the area of the epoxy wells 205 surrounding the raised features is recessed relative to the top surface 220 to form a containment area for the epoxy.

The photonic chip 140 also includes seven epoxy wells 205 disposed near the optical interface 215 and between the alignment slots 210. Although these epoxy wells 205 do not have raised features in FIG. 2, in other embodiments, there may be raised features within these epoxy wells 205. In one embodiment, all the epoxy wells 205 on the photonic chip 140 have the same depth and are formed during the same etching process.

The alignment slots 210 are designed to receive corresponding alignment features in the FAU. The arrangement of the slots 210 in the photonic chip 140 may enable passive alignment in at least one alignment direction. For example, by aligning the alignment features in the FAU to the alignment slots 210, the optical fibers mounted to the FAU are aligned with the optical interface 215 in at least one of the X, Y, or Z directions such that optical signals can be transferred between the photonic chip 140 and the optical fibers via the optical interface 215. The alignment slots 210 may have the same depth as the epoxy wells 205 or a different depth.

In one embodiment, the photonic chip 140 includes one or more TSVs, and thus, its thickness may be limited as explained above. However, the embodiments herein are not limited to edge coupling an FAU to a photonic chip 140 with TSVs but can be used in a photonic chip that does not includes TSVs.

Figure 3:
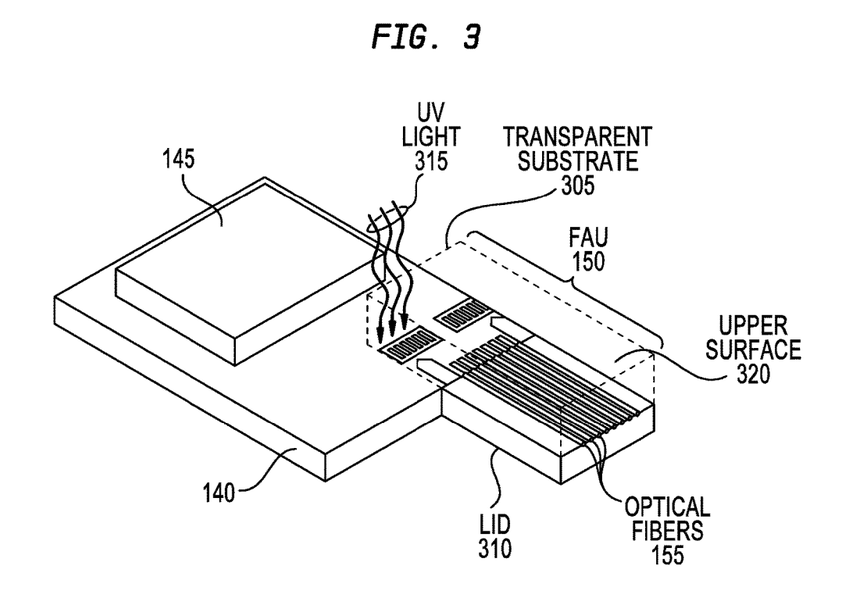
FIG. 3 illustrates coupling a fiber array unit to the photonic chip, according to one embodiment disclosed herein.

FIG. 3 illustrates coupling the FAU 150 to the photonic chip 140, according to one embodiment disclosed herein. As shown, the FAU 150 includes the optical fibers 155 which are mounted between a transparent substrate 305 and a lid 310. The transparent substrate 305 is shown in ghosted lines so that the underlying details of the FAU 150 and the photonic chip 140 can be seen. As used herein, "transparent" when used in context of the substrate 305 refers to a material that permits electromagnetic radiation that can cure epoxy to pass therethrough. Put differently, the transparent substrate 305 can be formed from any material which is transmissive (or transparent) to radiation used to cure the epoxy disposed in the epoxy wells 205. In one embodiment, the transparent substrate 305 is transparent to ultra violet (UV) light 315 which is used to cure the epoxy. However, the transparent substrate 305 does not need to be transparent to only UV light but could also be transparent to other types of light (e.g., visible light). Suitable materials for the transparent 305 could be glass or silicon dioxide. For example, the transparent substrate 305 may be formed from a silicon-on-insulator (SOI) structure where the base crystalline substrate has been removed leaving only a thin silicon layer disposed on top of a thicker silicon oxide layer. As discussed below, optical windows can be formed in the thin silicon layer so that UV light can pass through an upper surface 320 of the silicon dioxide layer (e.g., the transparent substrate 305) and through the optical windows to reach the epoxy wells 205, thereby curing the epoxy. In another embodiment, the substrate 305 may be a transparent molded material.

In one embodiment, the optical fibers 155 are aligned to respective waveguide adapters (not shown here) which are between the alignment slots 210 and the epoxy wells 205 at the optical interface 215. That is, the waveguide adapters can be exposed at the optical interface 215 (or recessed slightly away from the optical interface 215—e.g., a few microns) so that light can be transferred between the optical fibers 155 and waveguides in the photonic chip 140. In one embodiment, the FAU 150 is passively aligned to the photonic chip 140 using the alignments slots 210 and precise fabrication techniques so that active alignment is not needed.

Figure 4:
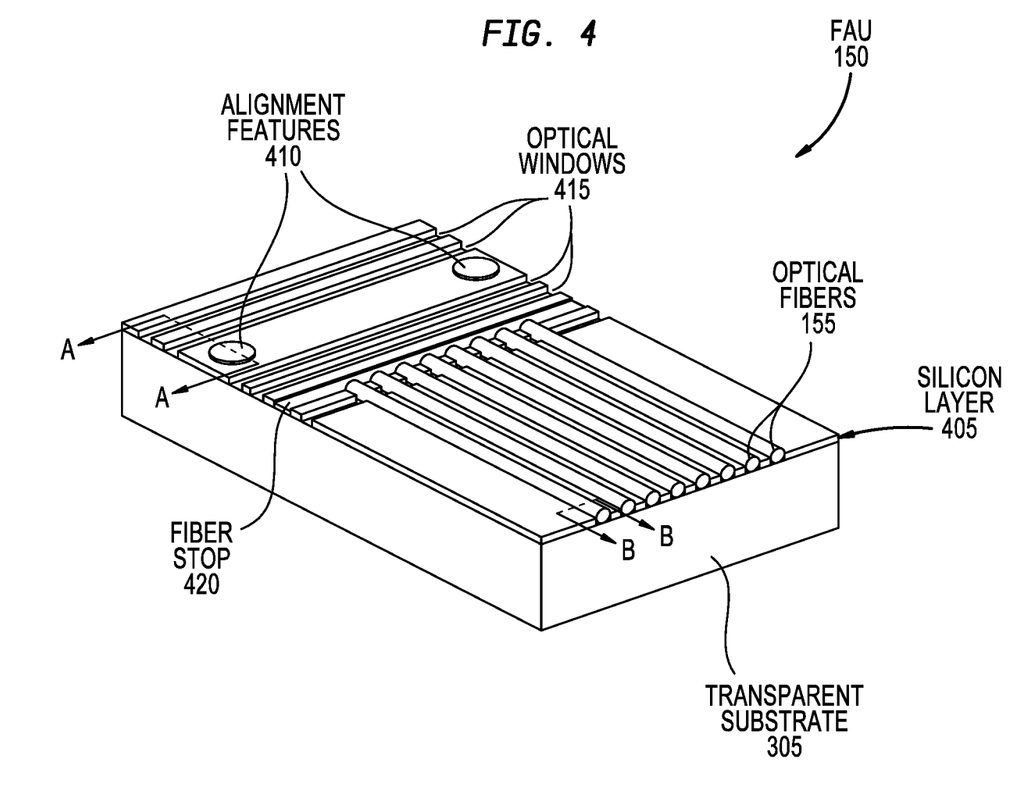
FIG. 4 illustrates a fiber array unit with optical windows, according to one embodiment disclosed herein

FIG. 4 illustrates the FAU 150 with optical windows 415, according to one embodiment disclosed herein. The FAU 150 is flipped relative to the state of the FAU 150 as shown in FIG. 3. Moreover, the lid 310 has been omitted so that the underlying features can be seen.

The FAU 150 includes the transparent substrate 305 as well as a thin silicon layer 405 disposed on the transparent substrate 305. Although crystalline silicon is described, the embodiments herein are not limited to such. For example, using silicon for the layer 405 may be preferred when the transparent substrate 305 is silicon dioxide since a SOI structure can be used to form the substrate 305 and the silicon layer 405. However, if other materials are used for the transparent substrate 305, then the layer 405 may be formed from a different material than silicon.

Generally, crystalline silicon in the silicon layer 405 is not transmissive to radiation that can be used to cure epoxy (e.g., UV light). As such, the silicon layer 405 is etched to include optical windows 415 where the silicon has been removed to expose the underlying transparent substrate 305. As such, the optical windows 415 define areas in the silicon layer 405 where UV light transmitted through the transparent substrate 305 can pass through the silicon layer 405 and reach epoxy wells in the photonic chip as shown in FIG. 3.

The optical windows 415 are disposed on a portion of the transparent substrate 305 that extends beyond a termination end of the optical fibers 155. That is, the optical fibers 155 stop at a fiber stop 420 but a portion of the silicon layer 405 (which includes the optical windows 415 and the alignment features 410) extends past the optical fibers 155. This portion of the silicon layer 405 is used to bond the FAU 150 to the top surface of the photonic chip.

In addition to forming the optical windows 415, the silicon layer 405 is etched to form grooves in which the optical fibers 155 are disposed. That is, when forming the FAU 150, the silicon in these areas is removed to form grooves for securing and aligning the optical fibers 155. The depth of the silicon layer 405 can be controlled such that the cores of the optical fibers 155 (e.g., the center portion of the optical fibers 155 which propagate the optical signals) are above the silicon layer 405 so that the cores can interface with the optical interface in the photonic chip. In one embodiment, the diameter of the fibers 155 may be around 125 microns thick (which include the core as well as the surrounding cladding). As such, in one embodiment, the thickness of the silicon layer 405 is less than 50 microns to ensure the core is above the silicon layer 405 but this thickness could change depending on the desired position of the fiber core relative to the substrate or the silicon layer 405. The thickness of the core and cladding may change depending on whether the optical fibers 155 are single-mode fibers or multi-mode fibers which may affect the thickness of the silicon layer 405.

The silicon layer 405 also includes the fiber stop 420. When placing the optical fibers 155 in the grooves, the fiber stop 420 serves as an alignment feature. That is, after placing the fiber 155 in a groove, the technician (or automated machine) can slide the fiber 155 until it contacts the fiber stop 420. In this manner, the fiber stop 420 can align the fibers 155 along the direction in which they extend, as well as ensure the fibers 155 terminate on the same plane. Thus, using the grooves and the fiber stop 420, the technician can passively align the optical fibers 155 to the FAU 150.

As shown, the fiber stop 420 has a smaller thickness than the other portions of the silicon layer 405. That is, the fiber stop 420 may be etched to remove some of the silicon. This may be desired so that when the fibers 155 are moved to butt up against the fiber stop 420, the stop 420 does not damage the core of the fibers 155. That is, although the thickness of the silicon layer 405 is controlled to be below the cores in the fiber 155, the thickness of the fiber stop 420 is further reduced so that the stop 420 is farther from the core, and thus, is less likely to damage the cores when aligning the fibers 155 in the FAU 150. However, this is not a requirement and in other examples the fiber stop 420 may have the same thickness as the other portions of silicon layer 405.

Alignment features 410 are disposed on the silicon layer 405 which are arranged on the FAU 150 to align with the alignment slots 210 shown in FIG. 2. When the alignment features 410 contact the ends of the alignment slots 210 furthest from the optical interface 215, this passively aligns the optical fibers 155 to the optical interface 215. The alignment features 410 may be formed from any material such as a dielectric, metal, and the like. Although circles are shown, the alignment features 410 can be other shapes such as rectangles or triangles which passively align the FAU 150 to the photonic chip. Further, in another embodiment, the roles may be reversed where the alignment slots 210 are formed in the silicon layer 405 of the FAU 150 while the alignment features 410 are disposed on the top surface 220 of the photonic chip 140.

One advantage of the FAU 150 is that the optical fibers 155 can be directly interfaced with the optical interface in the photonic chip. That is, some FAUs include internal waveguides (e.g., formed in a silicon substrate) which are optically coupled to the optical fibers mounted on the FAU. These internal waveguides are then routed through the FAU to an output interface where they are aligned to the optical interface in the photonic chip. The FAU 150, however, avoids having intermediary waveguides for optically coupling the optical fibers 155 to the photonic chip. This reduces the complexity of the FAU 150 and also reduces the number of alignments that need to be performed. Instead of aligning (and epoxying) the optical fibers to internal waveguides in the FAU and then aligning (and epoxying) the internal waveguides to the optical interface in the photonic chip, the FAU 150 aligns the optical fibers 155 directly to the photonic chip.

Figure 5A:
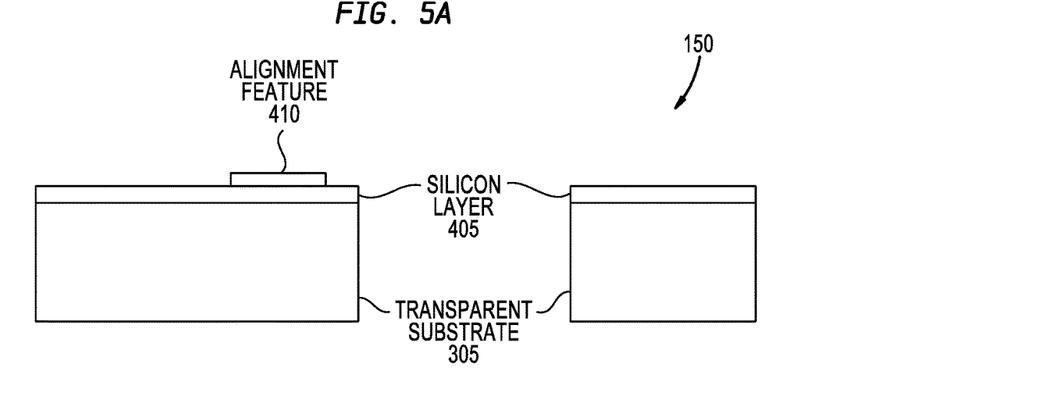
FIGS. 5A and 5B illustrate forming optical windows in a silicon layer of a fiber array unit, according to embodiments disclosed herein.
Figure 5B:
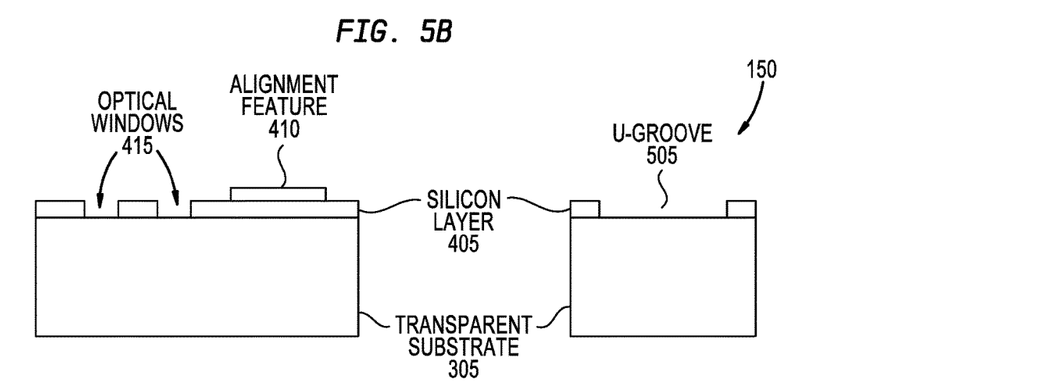

FIGS. 5A and 5B illustrate forming optical windows in the silicon layer 405 of the FAU 150, according to embodiments disclosed herein. The left side of FIG. 5A illustrates the cross section A-A shown in FIG. 4 while the right side of FIG. 5A illustrates the cross section B-B in FIG. 4. Moreover, FIG. 5A illustrates a time before the optical windows and the grooves have been formed in the FAU 150. For example, the silicon layer 405 may be a continuous sheet of silicon disposed on the transparent substrate 305.

FIG. 5B illustrates etching portions of the silicon layer 405 to form the optical windows 415 as well as a U-groove 505 in which an optical fiber is disposed. In one embodiment, the optical windows 415 and the U-groove 505 are formed in the same etching step or in separate etching steps. In one embodiment, DRIE is used to remove the silicon material to form the optical windows 415 and the U-groove 505. As mentioned above, the thickness or height of the silicon layer 405 is controlled such that when the optical fiber is placed in the U-groove, the core of the fiber is above the silicon layer 405.

In one embodiment, the material of the transparent substrate 305 forms an etch stop. That is, the etching technique used to etch the silicon in the silicon layer 405 may not remove the material of the transparent substrate 305 (e.g., the etching technique is selective). In this way, the height of the U-grooves can be tightly controlled to match the height of the silicon layer 405.

Figure 6:
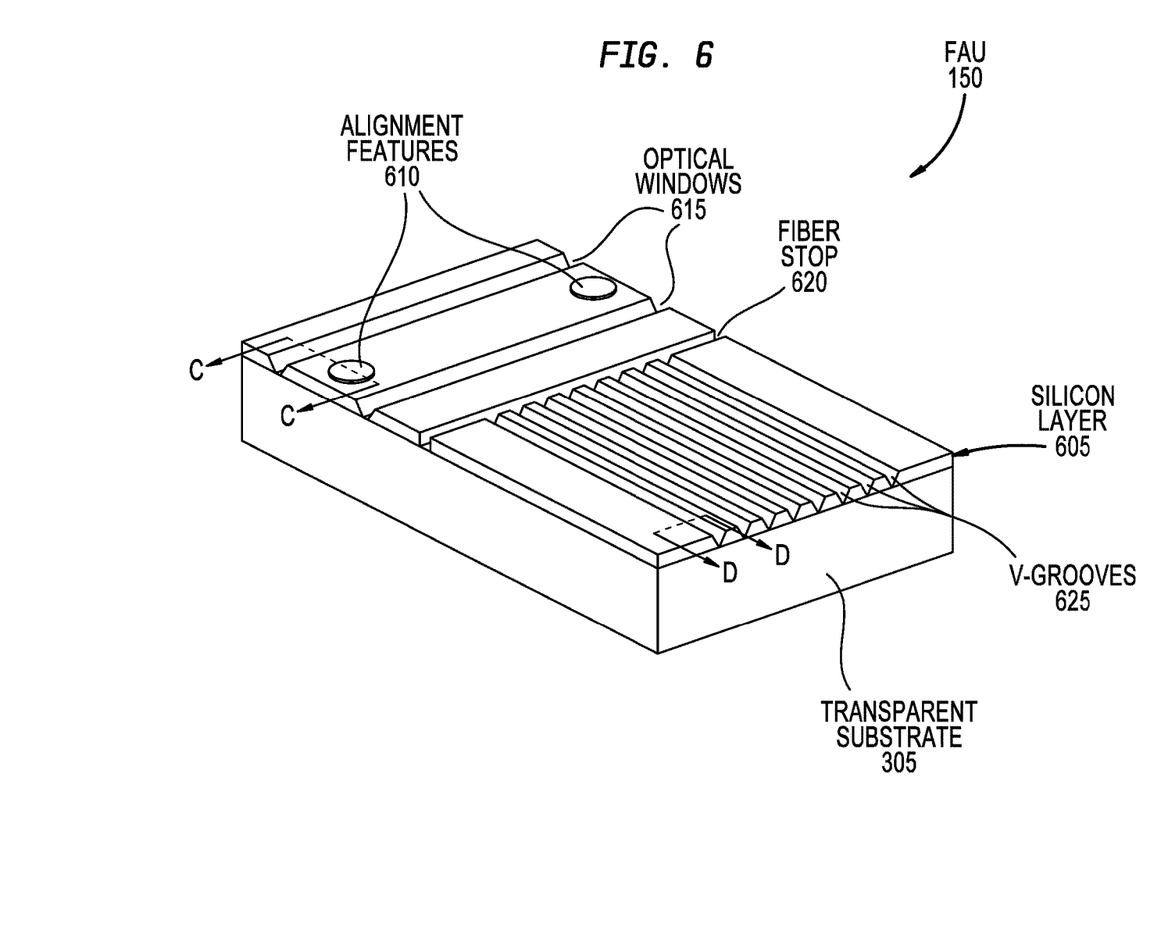
FIG. 6 illustrates a fiber array unit with optical windows, according to one embodiment disclosed herein.

FIG. 6 illustrates the FAU 150 with optical windows 615, according to one embodiment disclosed herein. The FAU 150 in FIG. 6 has similar features as the FAU 150 in FIG. 5 such as the optical windows 615 and grooves for holding the optical fibers (e.g., V-grooves 625) except these features have different shapes and can be formed using different fabrication techniques. For example, instead of using DRIE, the optical windows 615 and the V-grooves 625 are formed in a silicon layer 605 using an anisotropic etch such as a potassium hydroxide (KOH) etch. However, a fiber stop 610 may be formed using an isotropic etch such DRIE. That is, instead of using a KOH etch which forms slanted angles with the underlying substrate 305, DRIE can be used to form the fiber stop 620 with a surface that is perpendicular to the transparent substrate 305 which may better align the termination ends of the optical fibers 155 relative to using a surface that is slanted.

Figure 7A:
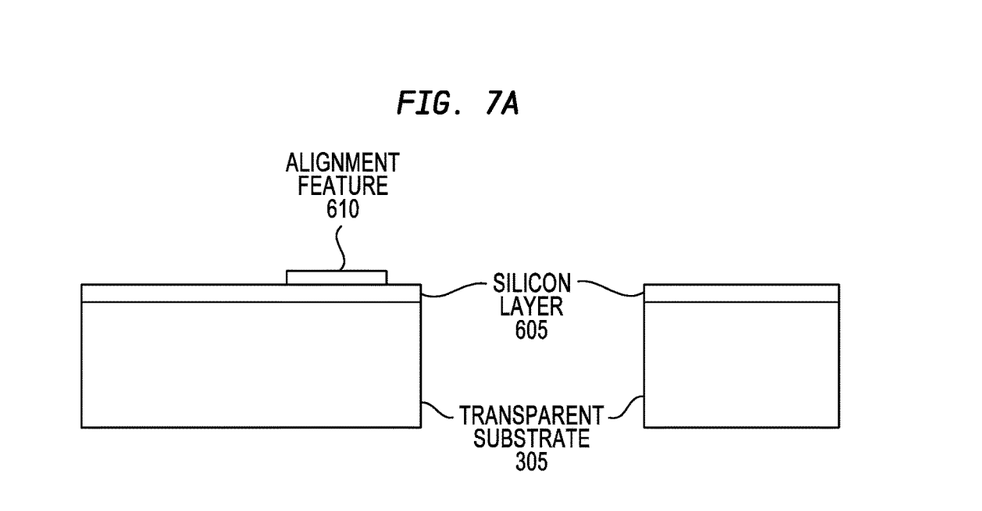
FIGS. 7A and 7B illustrate forming optical windows in a silicon layer of a fiber array unit, according to embodiments disclosed herein.
Figure 7B:
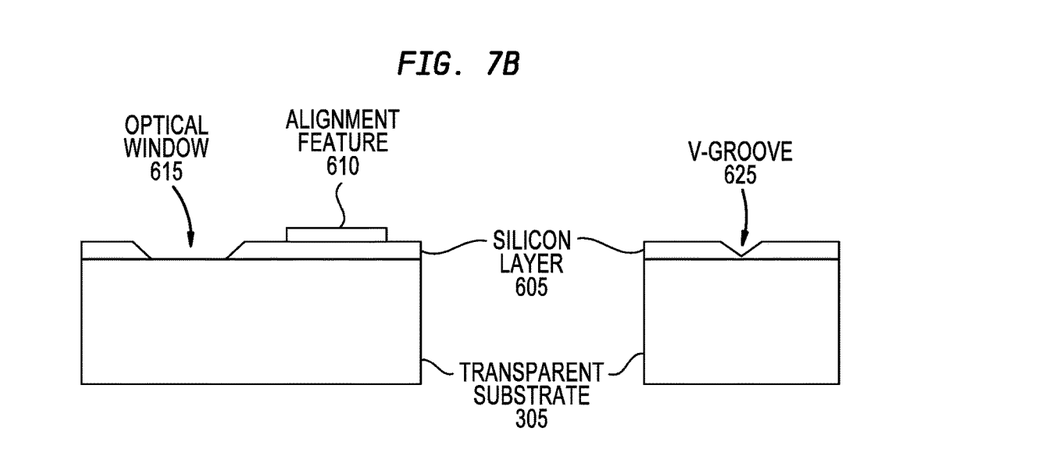

FIGS. 7A and 7B illustrate forming optical windows in a silicon layer of the FAU 150, according to embodiments disclosed herein. The left side of FIG. 7A illustrates the cross section C-C shown in FIG. 6 while the right side of FIG. 7A illustrates the cross section D-D in FIG. 6. Moreover, FIG. 7A illustrates a time before the optical windows and the grooves have been formed in the FAU 150. For example, the silicon layer 605 may be a continuous sheet of silicon disposed on the transparent substrate 305.

FIG. 7B illustrates etching portions of the silicon layer 605 to form the optical window 615 as well as the V-groove 625 in which an optical fiber is disposed. In one embodiment, the optical window 615 and the V-groove 625 are formed in the same anisotropic etching step or in separate etching steps. In one embodiment, a KOH etch is used to remove the silicon material to form the optical window 615 and the V-groove 625 which results in slanted sides. The angle of the slanted sides can vary depending on the crystalline orientation of the silicon layer 605. One advantage of using an anisotropic etch in contrast to an isotropic etch as shown in FIGS. 5A and 5B is that the height of the silicon layer 605 does not need to be controlled to ensure the proper depth of the V-grooves 625 for holding the optical fibers. Instead, a width of an aperture in a mask on the silicon layer 605 used during the KOH etch determines the depth of the V-grooves. Put differently, because a KOH etch has a known etch angle depending on the crystalline orientation, adjusting the width of the top opening of the V-groove 625 determines the depth of the V-groove. Because the KOH etch stops once the slanted sides of the V-groove 625 intersect, the thickness of the silicon layer 605 can be any thickness that is equal to, or greater than, the desired depth of the V-groove 625.

As shown, the width of the optical window 615 is much larger than the width of the V-groove 625, and as a result, the KOH etch exposes the underlying transparent substrate 305. This provides substantial flexibility in regards to the thickness of the silicon layer 605 since it can be any value greater than the depth of the V-groove 625 so long as the etch can expose the underlying transparent substrate when forming the optical window 615.

Figure 8:
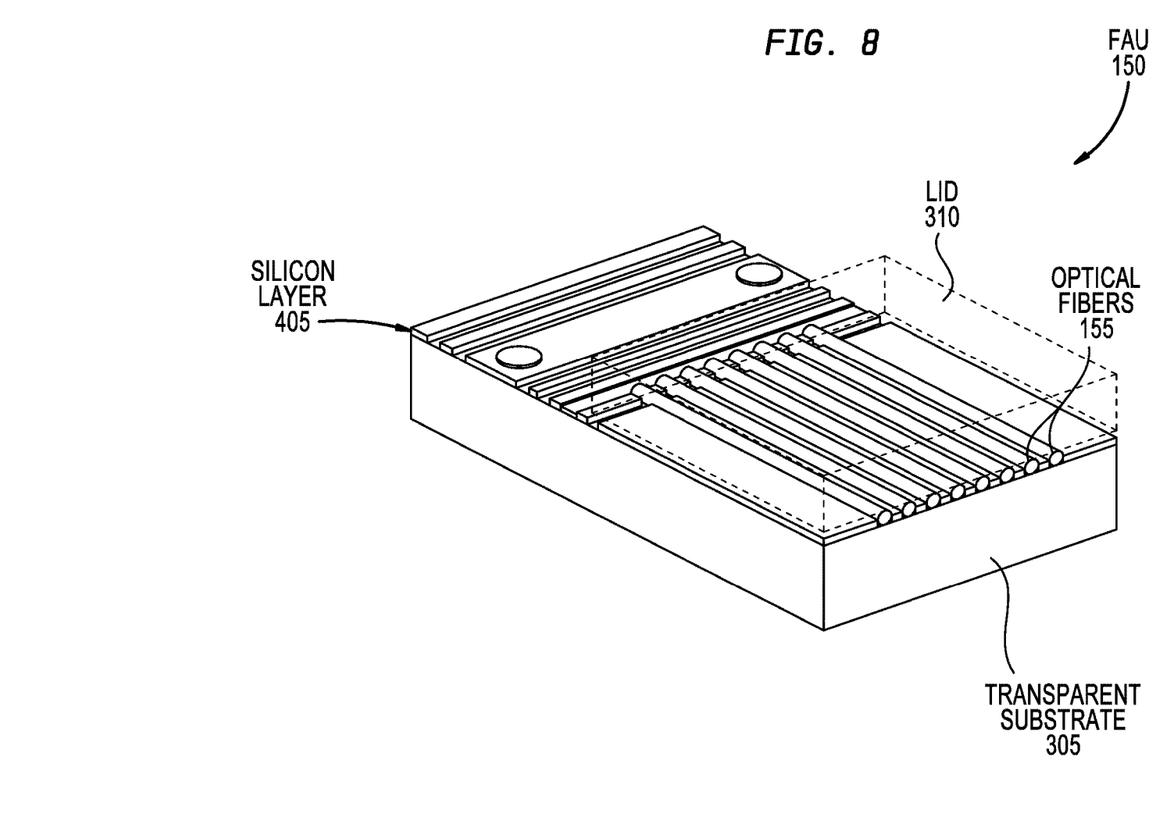
FIG. 8 illustrates a fiber array unit with optical windows, according to one embodiment disclosed herein.

FIG. 8 illustrates the FAU 150 with optical windows, according to one embodiment disclosed herein. The FAU 150 in FIG. 8 is the same as the FAU 150 shown in FIG. 4 except that the lid 310 has been added. The lid 310 may be any suitable substrate which can be used to hold the optical fibers 155 in the grooves formed in the silicon layer 405. For example, after aligning the optical fibers 155 in the grooves, epoxy may be deposited onto the fibers 155 and the lid 310 can be pressed down until it contacts the tops of the fibers 155. Once cured, the lid 310 and the epoxy hold the optical fibers 155 in the grooves in the silicon layer 405.

The lid 310 is not limited to any particular material. For example, the lid may be a transparent or non-transparent material, although it may be desirable to use a transparent material (e.g., glass) so that UV light can pass through the lid 310 to cure the epoxy used to hold the fibers 155 in the grooves.

Figure 9A:
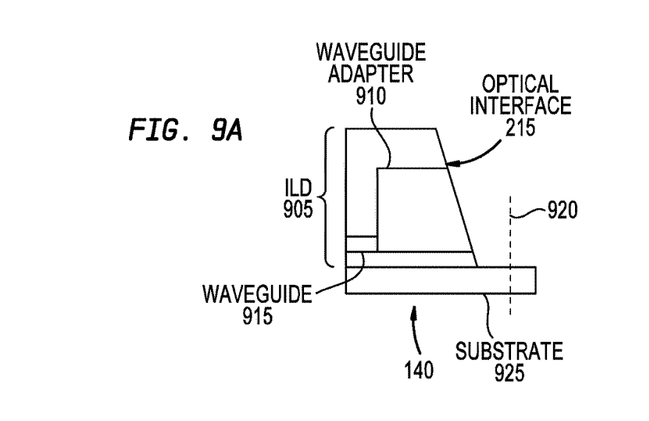
FIGS. 9A and 9B illustrate coupling an optical fiber in a fiber array unit to a photonic chip, according to embodiments disclosed herein.
Figure 9B:
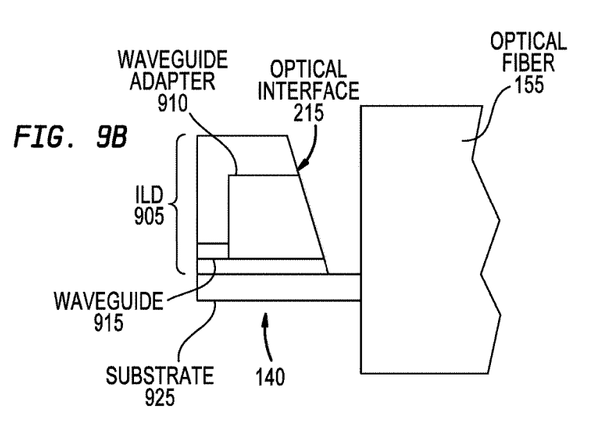

FIGS. 9A and 9B illustrate coupling an optical fiber in the FAU 150 to the photonic chip 140, according to embodiments disclosed herein. FIG. 9A illustrates a view of the photonic chip 140 that includes an interlayer dielectric (ILD) layer 905 disposed on a substrate 925. In one embodiment, the thickness or height of the ILD layer 905 is less than 15 microns.

The ILD layer 905 includes a waveguide adapter 910 that is optically coupled to a waveguide 915. Although the waveguide 915 is shown as being in the ILD layer 905 (e.g., a second layer), in other embodiments the waveguide 915 may be formed in the underlying substrate 925. In one embodiment, the waveguide adapter 910 changes the size of the optical mode of the optical signal passing therethrough to better match the mode size of the optical signal when traveling through the core of the optical fiber 155 versus the mode size when the optical signal travels through the waveguide 915. For example, the waveguide 915 may be a sub-micron waveguide (which has a width and thickness that is less than one micron) while the core of the fiber 155 may be 8-10 microns. As such, the mode size of an optical signal in the core of the optical fiber 155 may be an order of magnitude larger than the mode size of an optical signal in the waveguide 915. As such, directly interfacing the core of the optical fiber 155 with the waveguide 915 (without using the waveguide adapter 910) may incur substantial optical losses when transferring optical signals between the photonic chip 140 and the optical fiber 155. The waveguide adapter 910 converts or changes the mode size thereby providing a more efficient optical connection.

In one embodiment, the waveguide adapter 910 includes a plurality of prongs which have widths that vary along the length of the waveguide adapter 910 to change the mode size of the optical signal. For example, as the optical signal travels from the waveguide 915 to the optical interface 215, the optical signal may propagate on the plurality of prongs which increases the mode size to better match the size of the core in the optical fiber. When receiving an optical signal from the optical fiber 155, the shape of the prongs in the waveguide adapter 910 may constrain the optical signal into a single prong thereby reducing the mode size to better match the cross sectional area of the waveguide 915. However, the embodiments herein are not limited to any particular structure of the waveguide adapter 910 and can be used with known or future structures which permit efficient transmission of optical signals between a waveguide with different dimensions than the core of the optical fiber 155.

Moreover, the optical interface 215 has a slight angle relative to the substrate 925. For example, the optical interface 215 may be etched at an 85 degree angle which may improve the efficiency at which optical signals are transmitted between the optical interface 215 and the optical fiber 155.

The dotted line 920 indicates a plane along which the photonic chip 140 is diced or sawed to remove a portion of the substrate 925. Removing some of the substrate 925 permits the optical fibers 155 in the FAU to be moved closer to the optical interface 215 and the waveguide adapter 910 thereby lower the optical loss when transferring the signals between the waveguide 915 in the photonic chip 140 and the optical fiber 155. In one embodiment, the tolerance of the dice or sawing process may be +/−10 microns. Thus, to ensure the waveguide adapter 910 is not cut, the line 920 may be at least 10 microns away from the closest point in the optical interface 215. This avoids chipping or damaging the portion of the waveguide adapter 910 at the optical interface 215 and also permits the optical interface to be angled as shown. However, this means that the distance between the optical interface 215 and the optical fiber could be as much as 20 microns.

FIG. 9B illustrates bringing the optical fiber 155 in the FAU into contact with the diced or sawed edge of the substrate 925. In one embodiment, an index matching epoxy is applied to the optical interface 215 before moving the optical fiber 155 into contact with the substrate 925 which can improve the efficiency of the optical connection between the optical interface 215 and the optical fiber 155 relative to using air.

Figure 10A:
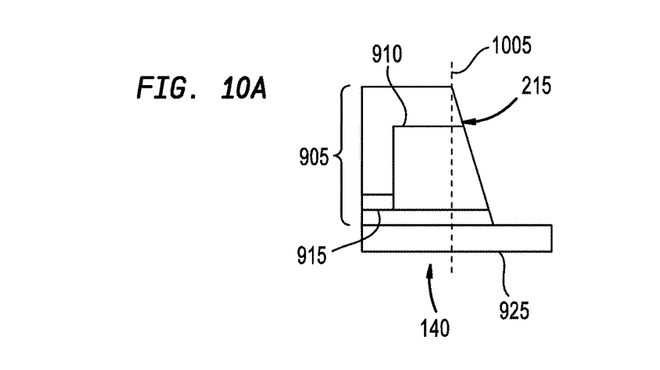
FIGS. 10A and 10B illustrate coupling an optical fiber in a fiber array unit to a photonic chip, according to embodiments disclosed herein.
Figure 10B:
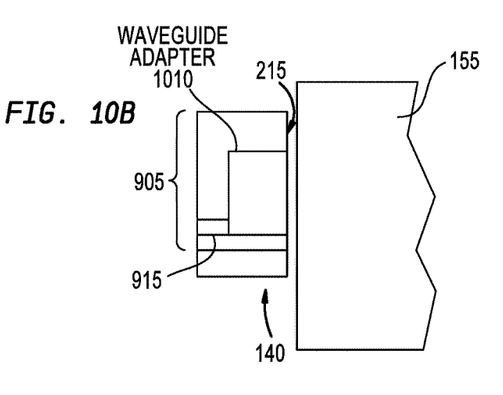

FIGS. 10A and 10B illustrate coupling the optical fiber 155 in a FAU to the photonic chip 140, according to embodiments disclosed herein. FIG. 10A illustrates a view of the photonic chip 140 that includes the ILD layer 905 disposed on the substrate 925. In one embodiment, the thickness or height of the ILD layer 905 is less than 15 microns.

Unlike in FIG. 9A, a dotted line 1005 in FIG. 10A illustrates that the photonic chip 140 is diced or sawed through the waveguide adapter 910. That is, in FIG. 9A, the chip 140 was diced to avoid cutting or damaging the waveguide adapter 910 and the optical interface 215. Here, the dotted line 1005 extends through the waveguide adapter 910 which, given the tolerances of the dicing technique, can result in cutting at least a portion of the optical interface 215 and the waveguide adapter 910. As mentioned above, doing so may damage the structures in the waveguide adapter 910 (thereby reducing the efficiency of the optical connection) but this also means the optical fiber 155 can be brought closer to the optical interface 215 and the waveguide adapter 910 (thereby improving the optical efficiency).

FIG. 10B illustrates butt coupling the optical fiber 155 to the optical interface 215 and a cut waveguide adapter 1010. When compared to FIG. 9B, the optical fiber 155 is closer to the waveguide adapter 1010 and the optical interface 215, but the dicing step may have damaged the waveguide adapter 1010. Moreover, the optical interface 215 is perpendicular to the substrate 925 rather than having the slight slant as shown in FIGS. 9A and 9B. Thus, there are tradeoffs between using the techniques in FIGS. 9A and 9B versus the techniques in FIGS. 10A and 10B. Like in FIG. 9B, an index matching epoxy may be disposed between the optical interface 215 and the optical fiber 155.

Figure 11:
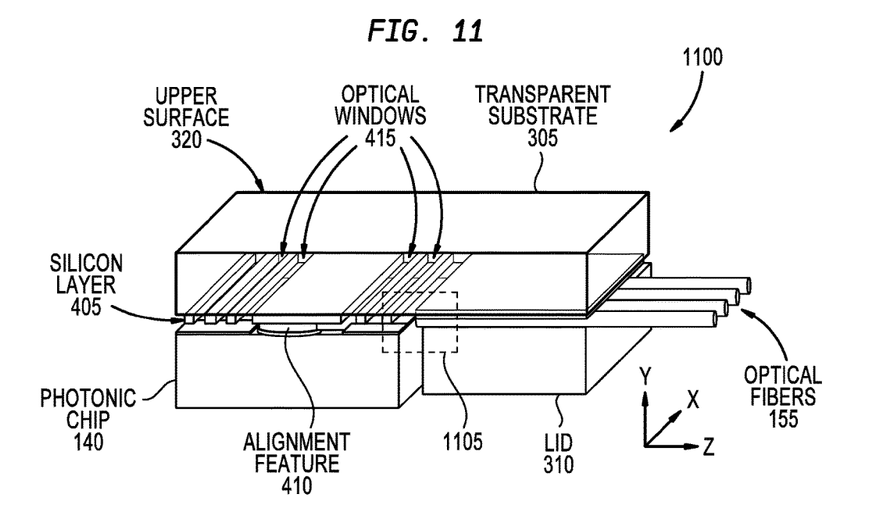
FIG. 11 illustrates a fiber array unit coupled to a photonic chip, according to one embodiment disclosed herein.

FIG. 11 illustrates an optical system 1100 that includes the FAU 150 coupled to the photonic chip 140, according to one embodiment disclosed herein. As shown, the FAU 150 is flipped relative to the view shown in FIG. 4 and placed on the photonic chip 140. Moreover, the alignment feature 410 is urged into one of the alignment slots (not labeled) in the photonic chip 140 in order to align the optical fibers 155 to the photonic chip 140. That is, the alignment features 410 are locked into the alignment slots which can passively align the optical fibers 155 to the photonic chip 140 in multiple directions.

The silicon layer 405 is etched to form multiple optical windows 415 which are disposed over at least one epoxy wells (not labeled) in the photonic chip 140. As a result, radiation emitted through the upper surface 320 of the transparent substrate 305 can pass through the optical windows 415 and cure the epoxy in the underlying epoxy wells.

In this embodiment, the optical windows 415 extend in a direction that is perpendicular to the longer sides of the rectangular epoxy wells 205 shown in FIG. 2. However, in other embodiments, the optical windows 415 can extend in a direction that is parallel to the longer sides of the epoxy wells 205. Moreover, the silicon sides in the silicon layer 405 that define the optical windows 415 may be arranged to contact the raised features or islands within the two epoxy wells 205 in FIG. 2 that are furthest from the optical interface 215. In one embodiment, the silicon sides of the optical windows 415 form a zero bond line thickness with the raised features in the epoxy wells 205. That is, only a very thin (essentially zero) layer of epoxy remains between the silicon sides of the optical windows 415 and the raised features after applying a force down onto the upper surface 320 of the transparent substrate 305. The zero bond line thickness can align the optical fibers 155 to the photonic chip 140 in the vertical (e.g., Y direction) while locking the alignment feature 410 in the alignment slot can align the optical fibers to the photonic chip 140 in the X and Z directions thereby achieving passive alignment. The epoxy in the recessed portions of the epoxy wells also contact structures in the silicon layer 405 to provide a secure bond between the FAU 150 and the photonic chip 140.

Figure 12:
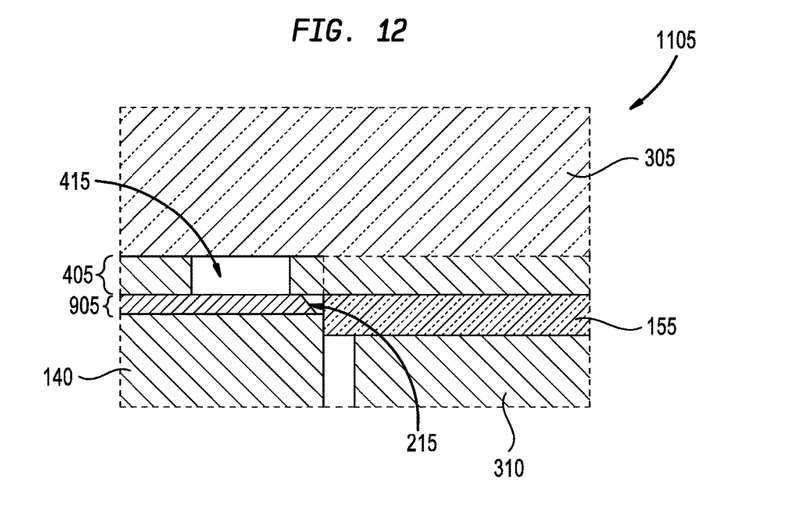
FIG. 12 illustrates a close up view of a portion of FIG. 11, according to one embodiment disclosed herein.

FIG. 12 illustrates a close up view of a portion 1105 of FIG. 11, according to one embodiment disclosed herein. The portion 1105 illustrates in greater detail the alignment between the optical fibers 155 and the optical interface 215 in the ILD layer 905 of the photonic chip 140. As shown, the portion 1105 includes the transparent substrate 305 on the top with the silicon layer 405 arranged underneath. The dotted lines illustrate that the optical fiber 155 is recessed in the silicon layer 405 and contacts the transparent substrate 305. That is, the optical fiber 155 may be disposed in a U-groove formed in the silicon layer 405 as shown in FIGS. 4 and 5B.

The core of the optical fiber 155 is aligned with the optical interface 215 in the ILD layer 905. As mentioned above, the ILD layer 905 may include a waveguide adapter which serves as an intermediary between the optical fiber 155 and a sub-micron waveguide in the ILD layer 905. In one embodiment, the thickness of the ILD layer 905 is controlled so that when the silicon layer 405 is brought into contact with the ILD layer 905, the core of the optical fiber 155 is aligned in the Y direction with a waveguide adapter in the ILD layer 905. Moreover, FIG. 12 illustrates that the optical fiber 155 can be aligned to the optical interface 215 to directly optically connect the fiber 155 with the interface 215 without using any kind of intermediate optical device such as a ball lens or a silicon micro lens (although index matched epoxy may be disposed between the fiber 155 and the interface 215).

In one embodiment, the epoxy wells and alignment slots shown in FIG. 2 extend through the ILD layer 905, although at different location in the ILD layer 905 than the side view shown here. However, the epoxy wells and alignment slots may continue to extend through the underlying substrate in the photonic chip 140. For example, the ILD layer 905 may be 15 microns thick but the epoxy wells and alignment slots may have a depth of 30 microns.

In one embodiment, the surface of the ILD layer 905 facing the silicon layer 405 may form a zero bond line thickness when epoxying the FAU to the photonic chip. Moreover, although the optical window 415 is shown as being hollow (e.g., an air gap), in one embodiment, epoxy from bonding the silicon layer 405 to the epoxy wells may extend up into the optical window 415.

Figure 13:
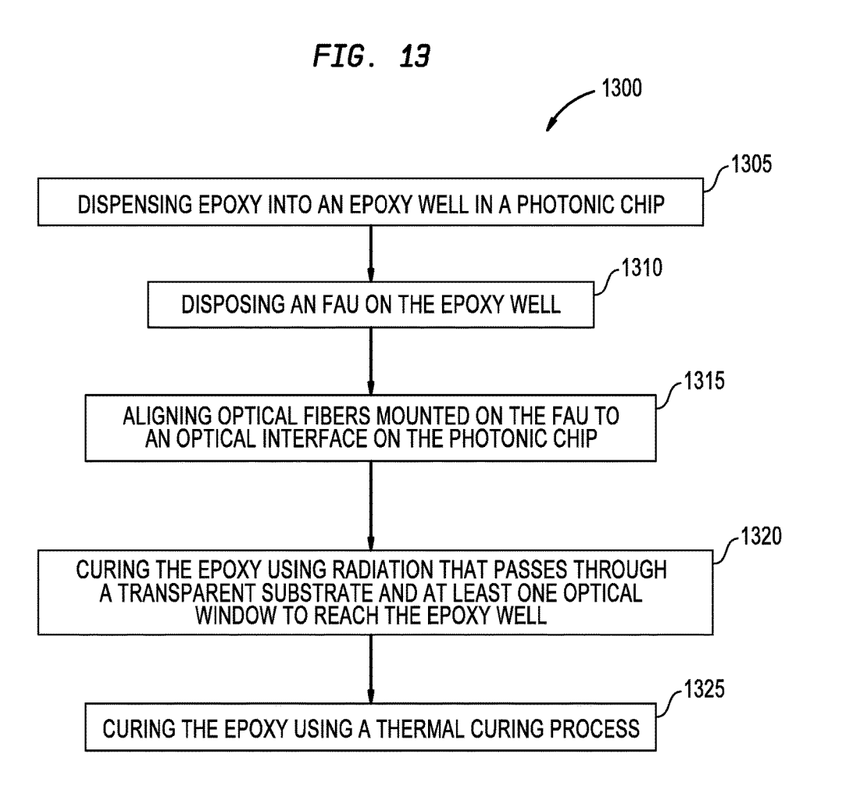
FIG. 13 is a flowchart for transmitting radiation through an FAU to cure an epoxy bond, according to one embodiment disclosed herein.

FIG. 13 is a flowchart of a method 1300 for transmitting radiation through an FAU to cure an epoxy bond, according to one embodiment disclosed herein. At block 1305, a technician dispenses epoxy into an epoxy well in a photonic chip—e.g., the epoxy wells 205 shown in FIG. 2. In one embodiment, the photonic chip includes multiple epoxy wells where some of the wells include raised features or islands which form additional surfaces for contacting an FAU.

At block 1310, the technician disposes an FAU on the epoxy well. In one embodiment, the FAU includes at least one optical window disposed over the epoxy well (but can include multiple optical windows extending over a single well). The optical window may be form an aperture in a non-transparent layer in the FAU (e.g., the silicon layer 405 or 605) which permits electromagnetic radiation passing through a transparent substrate to reach the epoxy well.

At block 1315, the technician aligns the optical fibers mounted on the FAU to an optical interface on the photonic chip. In one embodiment, the FAU and photonic chip include interlocking or mating alignment features such as the alignment slots 210 shown in FIG. 2 and the alignment features 410 shown in FIG. 4. By locking or mating the features, the optical fibers are aligned to the optical interface in the photonic chip to permit the fibers and photonic chip to transfer optical signals. In one embodiment, the alignment features permit the optical fibers to be aligned passively. However, in another embodiment, the optical fibers are actively aligned to the photonic chip. In yet another embodiment, the alignment features may permit passive alignment in one or more directions while active alignment is used in one or more other directions.

At block 1320, the epoxy is cured using radiation (e.g., UV light) that passes through a transparent layer (e.g., the transparent substrate 305) and at least one optical window to reach the epoxy well.

At block 1325, the epoxy is further cured using a thermal curing process. That is, the method 1300 includes two curing steps which rely on electromagnetic radiation and heat to cure the epoxy. However, in another embodiment, the block 1325 may be omitted and the epoxy is cured using only electromagnetic radiation.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   disposing epoxy into an epoxy well in a photonic chip;
   aligning an optical interface of the photonic chip to an optical fiber mounted on a fiber array unit (FAU), wherein the FAU comprises a first layer disposed on a transparent substrate, wherein the first layer comprises an optical window, and wherein the transparent substrate and the optical window are disposed over the epoxy well when the optical fiber is aligned to the optical interface; and
   curing the epoxy by passing electromagnetic radiation through the transparent substrate and the optical window to reach the epoxy well, wherein the curing is performed after aligning the optical interface to the optical fiber.

2. The method of claim 1, wherein the photonic chip comprises an alignment slot formed on a same surface as the epoxy well, wherein aligning the optical interface to the optical fiber comprises:
   urging an alignment feature disposed on the first layer in the FAU into the alignment slot thereby passively aligning the optical fiber to the optical interface.

3. The method of claim 1, further comprising, before aligning the optical fiber to the optical interface:
   disposing an index matching epoxy on the optical interface.

4. The method of claim 1, wherein the first layer comprises a material that is not transparent to the electromagnetic radiation, wherein the optical window forms an aperture in the material in the first layer thereby exposing the transparent substrate.

5. The method of claim 4, wherein the material of the first layer is crystalline silicon and a material of the transparent substrate is silicon dioxide.

6. The method of claim 1, further comprising:
   forming a groove in the first layer and the optical window in a same etching step; and
   mounting the optical fiber into the groove.

7. The method of claim 6, wherein the groove is a U-groove where a bottom surface of the U-groove is the transparent substrate.

8. The method of claim 6, wherein the groove is a V-groove, wherein the V-groove does not contact the transparent substrate.

9. An optical system, comprising:
   a photonic chip, comprising:
      a waveguide,
      an optical interface optically coupled to the waveguide, and
      an epoxy well; and
   a fiber array unit (FAU) coupled with the photonic chip using cured epoxy in the epoxy well, comprising:
      a transparent substrate,
      a first layer disposed on the transparent substrate, the first layer comprising an optical window and a groove,
      an optical fiber disposed in the groove and aligned to the optical interface in the photonic chip, and
      a lid, wherein the optical fiber is disposed between the lid and the transparent substrate,
      wherein the transparent substrate and the optical window are disposed over the epoxy well.

10. The optical system of claim 9, wherein the photonic chip further comprises a first alignment feature disposed on a same surface as the epoxy well and the FAU comprises a second alignment feature disposed on the first layer, wherein the first and second alignment features are arranged such that when mated, the optical fiber is passively aligned to the optical interface.

11. The optical system of claim 9, wherein the optical fiber is directly optically connected to the optical interface with an index matching epoxy disposed between the optical fiber and the optical interface.

12. The optical system of claim 9, wherein the first layer comprises a material that blocks ultra violet (UV) light, wherein the optical window forms an aperture in the material thereby exposing the transparent substrate, wherein a material of the transparent substrate is transparent to UV light.

13. The optical system of claim 12, wherein the material of the first layer is crystalline silicon and the material of the transparent substrate is silicon dioxide.

14. The optical system of claim 9, wherein the photonic chip comprises a waveguide adapter, wherein a first end of the waveguide adapter forms at least a part of the optical interface and a second, opposite end of the waveguide adapter is optically coupled to the waveguide, wherein the waveguide adapter is configured to adjust a mode size of optical signals transferred between the waveguide and the optical fiber.

15. The optical system of claim 14, wherein the epoxy well extends through a second layer in the photonic chip containing the waveguide adapter.

16. A fiber array unit (FAU), comprising:
   a transparent substrate;
   a first layer disposed on the transparent substrate, wherein a material of the transparent substrate is transparent to UV light while a material of the first layer blocks UV light;
   an optical window in the first layer, wherein the transparent substrate is one side of the optical window;
   a groove formed in the first layer; and
   an optical fiber disposed in the groove and terminates before reaching the optical window, wherein a first portion of the transparent substrate extends beyond a termination end of the optical fiber, wherein the optical window is disposed on the first portion of the transparent substrate.

17. The FAU of claim 16, further comprising:
   a plurality of alignment features formed on the first layer, wherein the plurality of alignment features are disposed over the first portion of the transparent substrate.

18. The FAU of claim 16, wherein a thickness of the first layer is less than a distance from a core in the optical fiber to the transparent substrate.

19. The FAU of claim 16, wherein at least one of (i) the material of the first layer is crystalline silicon and the material of the transparent substrate is silicon dioxide, and (ii) the material of the transparent substrate is a transparent molded material.

20. The FAU of claim 16, further comprising:
   a plurality of parallel grooves formed in the first layer; and
   a fiber stop formed in the first layer, wherein the fiber stop contacts termination ends of optical fibers disposed in the plurality of parallel grooves, wherein the fiber stop is between the plurality of parallel grooves and the optical window.

* * * * *